Feb. 18, 1969  YOSHIKAZU KUZE  3,427,883
THERMOSTAT
Filed Aug. 14, 1967  Sheet 1 of 3
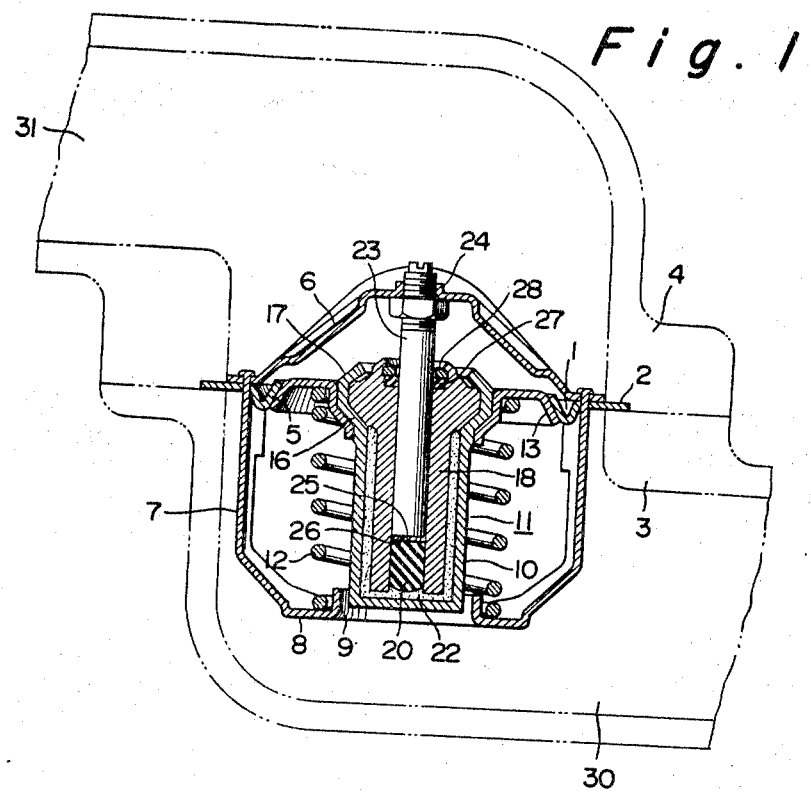
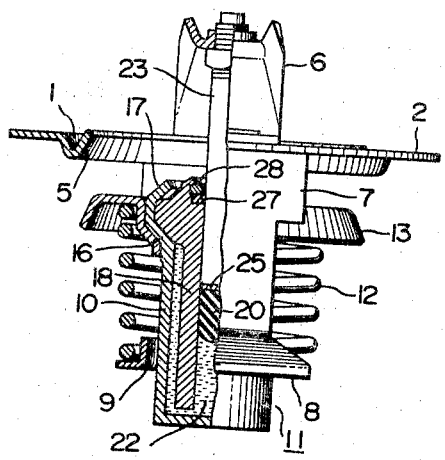
INVENTOR
YOSHIKAZU KUZE
BY Stevens, Davis, Miller & Mosher
ATTORNEYS

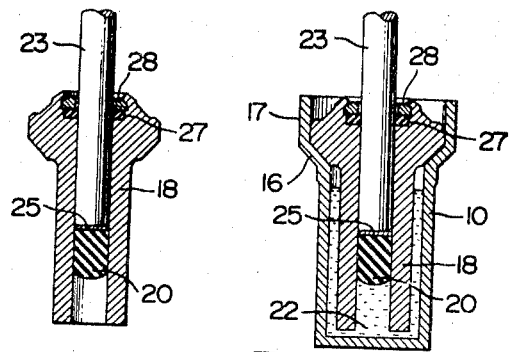
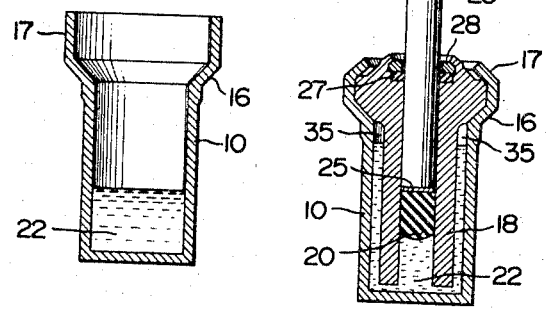
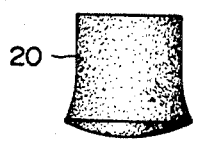
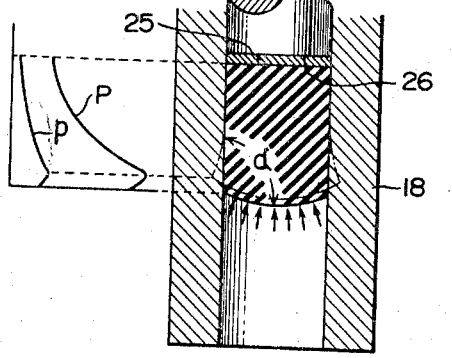
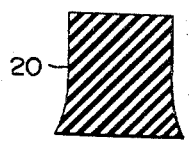

Feb. 18, 1969    YOSHIKAZU KUZE    3,427,883
THERMOSTAT
Filed Aug. 14, 1967    Sheet 3 of 3
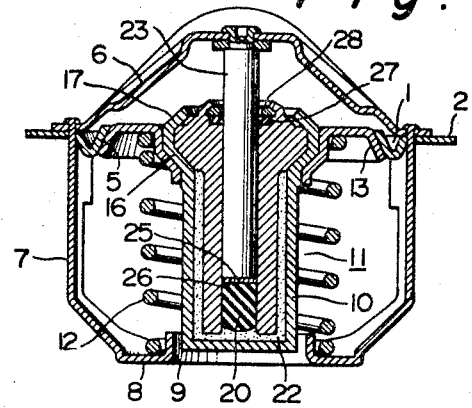
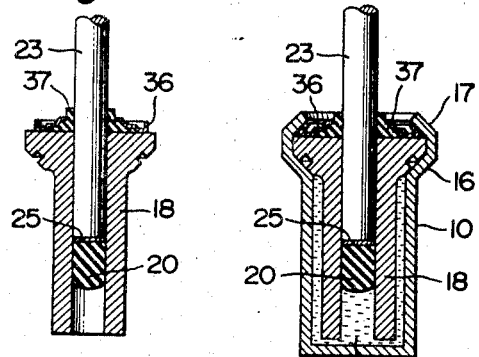
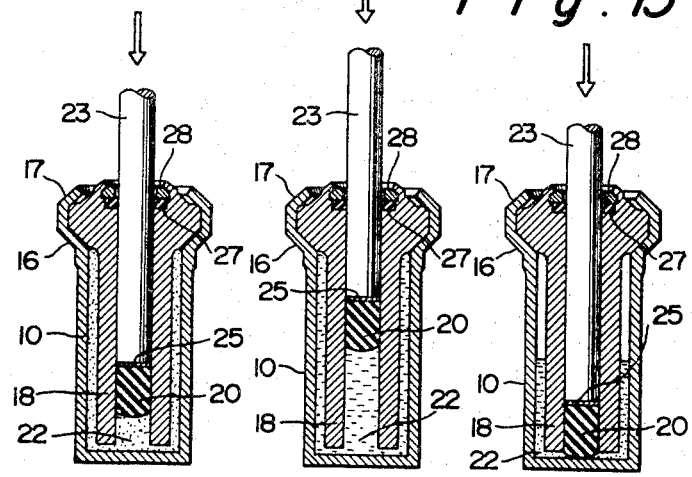
INVENTOR
YOSHIKAZU KUZE
BY Stevens, Davis, Miller & Mosher
ATTORNEYS United States Patent Office 3,427,883
Patented Feb. 18, 1969

3,427,883
THERMOSTAT
Yoshikazu Kuze, 3-Go, 31-Ban, 1-chome, Magome,
Higashi, Ohta-ku, Tokyo, Japan
Filed Aug. 14, 1967, Ser. No. 660,508
Claims priority, application Japan, Aug. 27, 1966,
41/56,213; Nov. 5, 1966, 41/72,620; Feb. 14,
1967, 42/9,059; Mar. 29, 1967, 42/19,156
U.S. Cl. 73—368.3                      6 Claims
Int. Cl. G01k 5/32

ABSTRACT OF THE DISCLOSURE

A thermostat having a heat sensitive chamber with a guide member fixedly mounted therein to define an annular space therebetween. The guide member has a straight axial bore passing therethrough with a push rod slidably mounted in said bore, a rubber-like sealing plug being mounted in said bore with one end in contact with said push rod. The plug is shaped to flare outwardly at its free end to provide a tight seal in the bore. A thermally responsive expansive substance fills the annular space and, upon application of heat to the thermostat, expands, exerting a force on the plug and push rod to open the valve.

---

This invention relates to a thermostat particularly adapted for use in the cooling systems of automobile engines.

One of the objects of the present invention is to provide a wax-type thermostat having a high thermal sensibility, a better durability, and a simple form.

Another object of this invention is to provide an improved sliding sealing means including a metallic guide member providing a centrally located, straight opening throughout and a rubber plug diverging toward its lower end and the bottom of which is convex, which will bring extraordinary durability and thermal responsibility to the present invention.

A further object of this invention is to provide a thermostat wherein the valve remains open even when the durability of the thermostat comes to an end.

Further, another object of this invention is to provide a method which eliminates not only the calibration of the thermo-element but also the adjustment of the push rod.

Still another object of this invention is to provide a thermostat wherein the thermo-element may have not only a positive stroke of the push rod when heated but also a negative stroke when wax leaks out.

Other objects and advantages will become more readily apparent upon proceeding with the following description and with reference to the accompanying drawings wherein:

FIG. 1 is a longitudinal sectional view of a thermostat according to the present invention;

FIG. 2 shows a thermostat according to the invention, in side elevation and partially in section, with the valve open;

FIGS. 3, 4, 5, and 6 show the progressive steps of assembling the thermo-element of the present invention;

FIG. 7 is a side view of the rubber or rubber-like plug;

FIG. 8 is a sectional view illustrating the contact pressure distribution between the rubber or rubber-like plug of FIG. 7 and a metallic guide member;

FIG. 9 is a sectional view of an alternate embodiment of the rubber-like plug;

FIG. 10 is a longitudinal sectional view of another embodiment of the thermostat;

FIGS. 11 and 12 are sectional views illustrating the thermo-element in which excess wax is filled;

FIG. 13 shows the case in which wax leaks; and

FIGS. 14 and 15 are sectional views illustrating other embodiments of the seal packing.

In the embodiment of the invention illustrated in FIG. 1, a housing 1 having an annular flange 2 extending thereabout is mounted in a sealing connection between the cylinder head 3 of an internal combustion engine and the hose fitting 4 leading to the radiator. The housing 1 terminates in an annular valve seat 5 having a fluid port therethrough. Positioned on one side surface thereof is an arcuately formed bridge member 6.

Extending from the flange 2 opposite to the arcuately formed bridge member 6, there is a supporting member 7 having diametrically spaced arms rigidly secured to the flange 2 together with the arcuately formed bridge member 6.

The support member 7 includes a bridge 8 having a central guide aperture 9 therein through which slidably extends a thermal conductive chamber 10 of a thermal sensitive element 11. A compression spring 12 is shown as being seated on the bridge 8 and as abutting the undersurface of a movable valve 13 attached to the thermal sensitive element 11 substantially concentric therewith.

It will be noted that the compression spring 12 constantly urges the movable valve 13 towards engagement with the valve seat 5. The thermal sensitive element 11 has an outside wall formed by an elongated cylindrical thermal conductive chamber 10 which has a free sliding fit in the guide aperture. The chamber 10 has a head portion formed by an outward extending tapered flange 16 and upstanding flange 17. Within the chamber 10 is a metallic guide member 18 which is provided with a centrally located straight opening throughout. A rubber or rubber-like deformable resilient plug 20 is fitted to the central opening in the metallic guide member 18. A head portion of the guide member 18 is sealingly clamped in position and rigidly secured to the chamber 10.

It will be noted that the rubber or rubber-like plug 20 (FIGS. 7 and 9) which diverges toward the lower end thereof is constantly urged into sealing engagement with the inner wall of the metallic guide member 18 by means of the contact pressure created at the contact face between the rubber or rubber-like plug 20 and the inner wall of the metallic guide member 18. As shown in FIG. 8, the contact pressure $p$ has a sharp peak near the side where said rubber or rubber-like plug is in contact with the wax thus assuring the formation of a positive fluid-tight seal at this portion. A thermal responsive expansible wax or wax-like substance 22 is retained between the chamber 10 and the guide member 18.

The bottom of the rubber or rubber-like plug 20 is formed convex so that contact angle $\alpha$ (FIG. 8) of the plug relative to the inner wall of the metallic guide member is an obtuse angle. This obtuse contact angle will increase not only the durability of the rubber or rubber-like plug but also the contact pressure. Expressly, by this obtuse contact angle the rubber plug will move smoothly when the plug is moved downwardly.

Positioined within the longitudinal opening in the metallic grade member 18 is a push-rod 23 which extends upwardly upon expansion of the wax or wax-like substance 22, the latter acting to move the rubber or rubber-like plug 20 along the inner wall of the metallic guide member 18 thereby forcing the push-rod 23 to move extendingly from the thermal conductive chamber 10. The upper end of the push-rod 23 is adjustably screwed and locked to the center of the arcuately formed bridge member 6. An anti-chafing disk 25, formed of a wear-resistant soft plastic material, is seated on the rubber or rubber-like plug 20 and acts, in turn, as a seat for the innermost end 26 of the push-rod 23. A ring seal 27 is interposed between a closure disk 28 and a recess in the guide member 18 and serves as a positive fluid-tight seal therebetween.

The operation of the present invention is as follows:

Referring to FIG. 1 the subject thermostat is shown installed between the cylinder head 3 and the hose fitting 4. When the thermostat is so positioned, it will be noted that the thermal sensitive element 11 of the thermostat projects downwards into the coolant in conduit 30 where it is always exposed to the fluid flow therein. This structural arrangement enables the wax or wax-like substance in thermal conductive chamber 10 to instantaneously and accurately reflect the variations in temperature of the fluids passing through conduit 30.

It will also be noted that, when the compression spring 12 has moved the valve member 13 to the position shown in FIG. 1, the passage of fluid between conduits 30 and 31 will be prevented by the engagement of the valve member 13 with valve seat 5. When the temperature of the fluid in conduit 30 reaches a predetermined operating temperature, the wax or wax-like substance 22 will expand in changing from a solid to a liquid state. The rubber-like plug 20 will transmit the force created by said wax or wax-like substance in expanding.

The movement of the thermal responsive expandible wax 22 will compress the spring 12 and positively move the valve 13 away from its seating engagement with the valve seat 5 so that free flow of cooling fluid can take place through the housing 1 into the manifold conduit 31. The contact pressure created at the contact face between the rubber or rubber-like plug 20 and the inner wall of the metallic guide member 18 becomes as large as P, and this pressure will be added to the pressure of the molten wax (FIG. 8) so that no wax leaks will occur between the plug and guide member. The expansion of the thermal sensitive wax will cause element 11 to move against the action of the spring 12 (FIG. 2). The rubber or rubber-like plug 20 is deformed during this movement.

If the temperature of the fluid in conduit 30 should decrease after the valve member 13 has been moved to an open position, the temperature of the wax or wax-like substance is likewise reduced thereby effecting a reduction in volume. The push-rod 23 will be withdrawn into the metallic guide member 18 as the spring 12 returns the valve 13 towards its closed position. Since lateral pressure is not applied to push-rod 23, as in the case of common wax or wax-like substances or the rubber cylinder-like type of thermal-elements, and furthermore since the push rod is protected by the metallic guide member 18 for its movement, frictional loss is almost negligible.

Further, the wax or wax-like substance is filled into a uniform and narrow space defined between the elongated cylindrical thermal conductive chamber 10 and the metallic guide member 18. The movement, due to the expansion of the wax or wax-like substance, acts in the axial direction of the deformable resilient plug 20 which will thus be tightly urged into sealing engagement with the metallic guide member 18. The thermal sensitivity of the inventive thermostat is thus greatly According to the present invention, it has now become possible for the valve to remain open when the durability of the rubber or rubber-like plug comes to an end. This function has been impossible in conventional wax-type thermostats. This feature is accomplished in the invention by the fact that the rubber-like plug 20 ages and changes in quality as it slides reciprocally within the guide member 18 year after year under high temperature and high pressure. Finally, the frictional resistance between the plug 20 and the guide member 18 will be so increased that the return spring cannot overcome the frictional resistance. Thus, the valve is kept open.

The temperature at which the valve begins to open depends on the melting point of wax. The opening distance of the valve at a determined temperature depends on the quantity of the wax in the chamber 10. According to the present invention, it is possible that a fixed quantity of wax in solid state can completely fill the space defined by the chamber 10, the metallic guide member 18, and the rubber or rubber-like plug 20. That is to say, the rubber or rubber-like plug 20 is inserted into the metallic guide member 18 to a depth sufficient enough to absorb an increment volume of the wax (FIG. 3). Then, as shown in FIG. 5, the guide is fitted into the thermal conductive chamber 10 in which a determined quantity of wax has been placed (FIG. 4). Any air is then removed from the chamber. Following this step, the head portion of the metallic guide member 18 is clamped in position by pressing inwardly the flanges 16 and 17 thereby sealing and rigidly securing the guide member to the chamber 10 (FIG. 6). Vacuum pocket 35 remains between the metallic guide member 18 and the chamber 10 but is replaced by molten wax at a predetermined temperature (FIG. 2). Also, the valve closes whenever the ambient temperature decreases (FIG. 1) by the compression spring 12.

Thus, the valve begins to open and the lift of the valve is also always the same for any given temperature. The present invention therefore eliminates not only the calibration of the thermo-element but also the adjustment of the push rod 23. The inventive thermostat may therefore be mass produced at the lowest possible cost.

FIG. 10 shows one of the low-cost thermostats in which the free end of the push rod 23 is riveted to the center of the arcuately formed bridge member 6. Of course, the calibration of the thermo-element 11 is eliminated with this particular construction.

When excess wax is filled in the chamber, as shown in FIG. 11, the thermo-element may have not only the positive stroke of the push rod 23 when heated, as shown in FIG. 12, but also a negative lift because the compression spring (not shown) exerts a force against the push rod 23 when wax leaks out, as shown in FIG. 13.

The above-described negative lift may serve many purposes, for example, that of warning the presence of wax leakage, to shift the spool of the pneumatic or the hydraulic control valve from its neutral or positive position to the negative position when wax leaks, thereby guaranteeing the safety of the devices.

As shown in FIG. 14, the retainer 36 is so arranged that the outer circumference extends upright nearly at a right angle and the outer diameter is less than the diameter of the head portion of the metallic guide member 18. Therefore, the retainer 36 offers no obstacle in pressing inwardly the upstanding flange 17 of the chamber 10 (FIG. 15). However, since the uprightly extending portion of the outer periphery of the retainer is slightly bent inwardly, as shown in FIG. 15, seal packing 37 will not fall off.

What is claimed is:

1. A thermostat comprising a thermal conductive chamber, guide means having a straight axial bore passing therethrough, said guide means being fixedly mounted in said chamber and defining an annular space therebetween, a push rod slidably mounted in said bore, a rubber-like sealing plug mounted in said bore with one end in contact with one end of said push rod, said plug diverging towards a sharp peak adjacent the opposite end thereby forming a fluid-tight seal between said plug and said guide member, a wax-like thermally responsive expansive substance sealed within said annular space in communication with said plug whereby, upon application of heat to said thermostat, said expansive substance expands to exert a force on the lower end of said sealing plug to thus push said push rod from the bore in said guide means.

2. A thermostat as claimed in claim 1 in which said sealing plug is convex at its bottom end to form an obtuse contact angle between said sealing plug and the inner wall of the metallic guide member whereby the sealing plug will move smoothly in said guide member and the durability of said sealing plug will be increased.

3. A thermostat as claimed in claim 1 in which the sealing plug is inserted into the metallic guide member to a depth sufficient to absorb the increment volume increase of the wax-like substance in the thermal conductive chamber and any voids in said annular space being substantially evacuated.

4. A thermostat as claimed in claim 1 in which the free end of the push rod is fixedly attached to a center portion of an arcuately formed bridge member valve means operatively connected to said chamber thereby eliminating both calibration of the thermo-element and the adjustment of the push rod.

5. A thermostat as claimed in claim 1 in which excess wax is filled in the chamber thereby imparts a positive stroke to the push rod when said wax is heated and a negative stroke when said wax leaks out.

6. A thermostat as claimed in claim 1 in which seal packing means are provided between the projecting end of said push rod and said bore, said packing means comprising an annular retaining ring mounted about said push rod, and an annular gasket mounted about said push rod between said retaining ring and said guide member, said retaining ring being secured to said guide member to hold said gasket in position.

References Cited
UNITED STATES PATENTS

| | | | |
|---|---|---|---|
| 2,981,477 | 4/1961 | Salmon | 73—363 XR |
| 3,231,194 | 1/1966 | Kuze | 236—34.5 |

LOUIS R. PRINCE, *Primary Examiner.*

WM. HENRY II, *Assistant Examiner.*

U.S. Cl. X.R.

236—99